(12) United States Patent
Yi et al.

(10) Patent No.: US 9,549,170 B2
(45) Date of Patent: Jan. 17, 2017

(54) THREE-DIMENSIONAL IMAGE DISPLAY DEVICE

(71) Applicant: Samsung Display Co., Ltd., Yongin, Gyeonggi-Do (KR)

(72) Inventors: Jung Hwan Yi, Seoul (KR); Moon Jung Baek, Seoul (KR)

(73) Assignee: Samsung Display Co., Ltd. (KR)

( * ) Notice: Subject to any disclaimer, the term of this patent is extended or adjusted under 35 U.S.C. 154(b) by 284 days.

(21) Appl. No.: 14/275,131

(22) Filed: May 12, 2014

(65) Prior Publication Data

US 2015/0145976 A1    May 28, 2015

(30) Foreign Application Priority Data

Nov. 27, 2013  (KR) .......................... 10-2013-0145117

(51) Int. Cl.
  *H04N 13/04*    (2006.01)
(52) U.S. Cl.
  CPC ...... *H04N 13/0447* (2013.01); *H04N 13/0404* (2013.01); *H04N 13/0497* (2013.01)
(58) Field of Classification Search
  CPC ................................................. H04N 13/0447
  See application file for complete search history.

(56) References Cited

U.S. PATENT DOCUMENTS

| 5,833,507 A * | 11/1998 | Woodgate .......... H04N 13/0409 348/E13.004 |
| 6,064,424 A | 5/2000 | Van Berkel et al. |
| 2009/0002262 A1 | 1/2009 | Fukushima et al. |
| 2012/0075434 A1 | 3/2012 | Kim et al. |

(Continued)

FOREIGN PATENT DOCUMENTS

| JP | 2012-108194 | 6/2012 |
| KR | 1020130053229 A | 5/2013 |

(Continued)

*Primary Examiner* — Tung Vo
*Assistant Examiner* — Rowina Cattungal
(74) *Attorney, Agent, or Firm* — Innovation Counsel LLP (57) ABSTRACT

A 3D image display device includes a display panel and a viewpoint divider. The display panel includes pixels arranged in a matrix shape and respectively representing one color among primary colors and light blockers provided between the pixels. The viewpoint divider divides an image displayed by the display panel into at least two viewpoints, the viewpoint divider including viewpoint dividing units. The viewpoint dividing units are located in parallel with respect to a column direction of the display panel. A number $N_P$ of pixels at a unit view region satisfies $N_P=2(3n+1)+1$, a number $N_L$ of viewpoint dividing units satisfies $N_L=3n+1$, and a number $N_V$ of viewpoints satisfies $N_V=2(3n+1)+1$ when a width ratio of the pixels in a row direction and the light blockers in the row direction is $3n:1$. The $N_P$ pixels are located to correspond to the $N_L$ viewpoint dividing units.

11 Claims, 7 Drawing Sheets

| n | 1 | 2 | 3 | 4 | 5 |
|---|---|---|---|---|---|
| $BM_{ratio}$ | 1 | 1 | 1 | 1 | 1 |
| $Pixel_{ratio}$ | 3 | 6 | 9 | 12 | 15 |
| $Num_{Pixel}$ | 9 | 15 | 21 | 27 | 33 |
| $Num_{Lens}$ | 4 | 7 | 10 | 13 | 16 |
| $Num_{View}$ | 9 | 15 | 21 | 27 | 33 |

(56) References Cited

U.S. PATENT DOCUMENTS

2012/0170833 A1* 7/2012 Kokojima .......... H04N 13/0022
  382/154
2013/0083089 A1 4/2013 Koito et al.
2015/0077667 A1 3/2015 Lee et al.

FOREIGN PATENT DOCUMENTS

KR   1020130055997 A   5/2013
KR   1020150032387      3/2015

* cited by examiner

|  | | 1 | 2 | 3 | 4 | 5 | 6 | 7 | 8 | 9 |
|---|---|---|---|---|---|---|---|---|---|---|
| Lens Number | 1 | R | R | R | ■ | G | G | G | ■ | B |
|  | 2 | B | B | ■ | R | R | R | ■ | G | G |
|  | 3 | G | ■ | B | B | B | ■ | R | R | R |
|  | 4 | ■ | G | G | G | ■ | B | B | B | ■ |
| RATIO | R | 1 | 1 | 1 | 1 | 1 | 1 | 1 | 1 | 1 |
|  | G | 1 | 1 | 1 | 1 | 1 | 1 | 1 | 1 | 1 |
|  | B | 1 | 1 | 1 | 1 | 1 | 1 | 1 | 1 | 1 |
|  | K | 1 | 1 | 1 | 1 | 1 | 1 | 1 | 1 | 1 |

View number →

FIG. 6

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | R | R | R | R | R | R | ■ | G | G | G | G | G | G | ■ | B |
| 2 | B | B | B | B | B | ■ | R | R | R | R | R | R | ■ | G | G |
| 3 | G | G | G | G | ■ | B | B | B | B | B | B | ■ | R | R | R |
| 4 | R | R | R | ■ | G | G | G | G | G | G | ■ | B | B | B | B |
| 5 | B | B | ■ | R | R | R | R | R | R | ■ | G | G | G | G | G |
| 6 | G | ■ | B | B | B | B | B | B | ■ | R | R | R | R | R | R |
| 7 | ■ | G | G | G | G | G | ■ | B | B | B | B | B | B | ■ | |
| R | 2 | 2 | 2 | 2 | 2 | 2 | 2 | 2 | 2 | 2 | 2 | 2 | 2 | 2 | 2 |
| G | 2 | 2 | 2 | 2 | 2 | 2 | 2 | 2 | 2 | 2 | 2 | 2 | 2 | 2 | 2 |
| B | 2 | 2 | 2 | 2 | 2 | 2 | 2 | 2 | 2 | 2 | 2 | 2 | 2 | 2 | 2 |
| K | 1 | 1 | 1 | 1 | 1 | 1 | 1 | 1 | 1 | 1 | 1 | 1 | 1 | 1 | 1 |

View number →

Lens Number ↓

RATIO

FIG. 7

| n | 1 | 2 | 3 | 4 | 5 |
|---|---|---|---|---|---|
| $BM_{ratio}$ | 1 | 1 | 1 | 1 | 1 |
| $Pixel_{ratio}$ | 3 | 6 | 9 | 12 | 15 |
| $Num_{Pixel}$ | 9 | 15 | 21 | 27 | 33 |
| $Num_{Lens}$ | 4 | 7 | 10 | 13 | 16 |
| $Num_{View}$ | 9 | 15 | 21 | 27 | 33 |

THREE-DIMENSIONAL IMAGE DISPLAY DEVICE

CROSS-REFERENCE TO RELATED APPLICATION

This application claims priority to and the benefit of Korean Patent Application No. 10-2013-0145117 filed in the Korean Intellectual Property Office on Nov. 27, 2013, the entire contents of which are incorporated herein by reference.

BACKGROUND (a) Field The present application relates to a 3D image display device.

(b) Description of the Related Art

Recently, as a display device technique has been developed, a display device capable of displaying a 3-dimensional (3D) image has attracted attention, and various 3D image displaying methods have been researched.

In general, in a 3D image display technology, stereoscopic perception of an object is represented by using binocular parallax as the largest factor for recognizing stereoscopic perception at a near distance. That is, when different 2D images are reflected in a left eye and a right eye, respectively, and the image reflected in the left eye (hereinafter referred to as a "left eye image") and the image reflected in the right eye (hereinafter referred to as a "right eye image") are transferred to a brain, the left eye image and the right eye image are combined in the brain to be recognized as the 3D image having depth perception or stereoscopic perception.

The 3D image display device capable of displaying the 3D image uses the binocular parallax, and includes a stereoscopic type of 3D image display device using glasses such as shutter glasses, polarized glasses, or the like, and an autostereoscopic type of 3D image display device in which an optical system such as a lenticular lens, a parallax barrier, or the like is disposed in a display device without using glasses.

As the autostereoscopic type, the display device using the lenticular lens, which has been most frequently used and developed in recent years, realizes a 3D image by dividing the 3D image into several viewpoints with the lenticular lens and displaying it.

In such a 3D image display device using the lenticular lens, color filters and black matrixes between the color filters are recognized as spots due to non-uniform luminance. Since the black matrixes are repeatedly formed, a moiré phenomenon is generated in the 3D display device, and the moiré phenomenon deteriorates the image quality.

An attempt was made to employ a lens-inclining structure to remove the moiré phenomenon. If the lens-inclining structure is employed, the material cost is increased, the process becomes difficult, and a diffraction efficiency asymmetry phenomenon is generated in left and right lenses.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a 3D image display device having advantages of preventing reduction in luminance caused by a moiré phenomenon without inclining a lens.

An exemplary embodiment provides a 3D image display device including a display panel and a viewpoint divider. The display panel is configured to include a plurality of pixels arranged in a matrix shape and respectively representing one color among a plurality of primary colors and light blockers provided between the pixels. The viewpoint divider is configured to divide an image which is displayed by the display panel into at least two viewpoints. The viewpoint divider includes a plurality of viewpoint dividing units, wherein the viewpoint dividing units are located in parallel with respect to a column direction of the display panel. A number $N_P$ of pixels at a unit view region satisfies $N_P=2(3n+1)+1$, a number $N_L$ of viewpoint dividing units satisfies $N_L=3n+1$, and a number $N_V$ of viewpoints satisfies $N_V=2(3n+1)+1$ when a width ratio of the pixels in a row direction and the light blockers in the row direction is 3n:1, n being a natural number. The $N_P$ pixels are located to correspond to the $N_L$ viewpoint dividing units.

The viewpoint divider may include a plurality of lenticular lenses, and the viewpoint dividing units may include the lenticular lenses.

The $N_V$ viewpoints may have the same luminance.

One of the pixels may be divided into 3n regions, and the 3n regions of the pixel may be respectively assigned to different viewpoints by using the viewpoint dividing units.

The 3n regions of the pixel may be respectively assigned to different viewpoints by using the same viewpoint dividing unit.

The 3n regions of the pixel may be respectively assigned to different viewpoints by using two different viewpoint dividing units.

The pixels may include red pixels, green pixels, and blue pixels that are sequentially repeated in the row direction, or red pixels, blue pixels, and green pixels that are sequentially repeated in the row direction.

The viewpoint divider may divide an image displayed by the display panel into 9 viewpoints.

The viewpoint divider may divide an image displayed by the display panel into 15 viewpoints.

Each of the NV viewpoints may include one light blocker.

In accordance with the exemplary embodiment, it is possible to reduce left and right widths of a frame by fixing a lens inclination, and it is possible to improve uniformity of luminance in spite of a moiré phenomenon by specifying a ratio of pixels and light blockers and a lens frequency.

DETAILED DESCRIPTION OF THE EMBODIMENTS

Hereinafter, an exemplary embodiment will be described in detail with reference to the attached drawings such that the inventive concept can be easily put into practice by those skilled in the art. As those skilled in the art would realize, the described embodiments may be modified in various different ways, all without departing from the spirit or scope of the inventive concept. On the contrary, exemplary embodiments introduced herein are provided to make disclosed contents thorough and complete, and sufficiently transfer the spirit of the inventive concept to those skilled in the art.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. Like numbers refer to like elements throughout the specification.

First, a 3D image display device will be described with reference to FIG. 1 to FIG. 5 in accordance with an exemplary embodiment.

Figure 1:
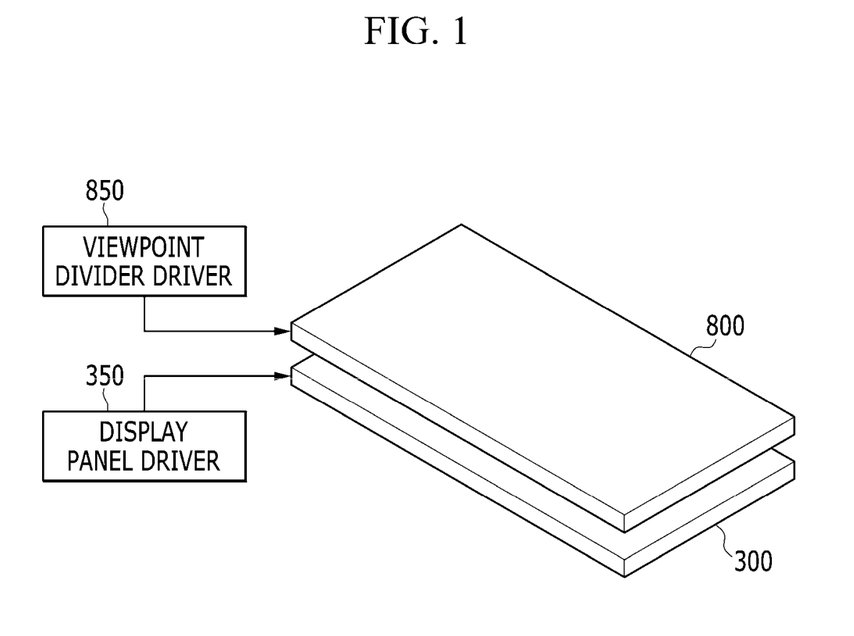
FIG. 1 is a schematic perspective view showing a 3D image display device in accordance with an exemplary embodiment.
Figure 2:
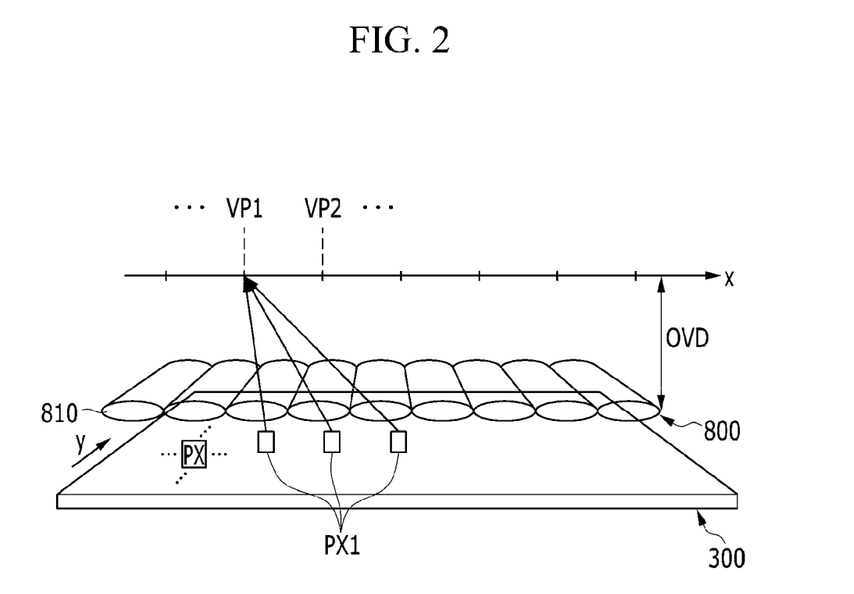
FIG. 2 is a schematic side perspective view showing the 3D image display device in accordance with the present exemplary embodiment.

FIG. 1 is a schematic perspective view showing the 3D image display device in accordance with the exemplary embodiment. FIG. 2 is a schematic side perspective view showing the 3D image display device in accordance with the present exemplary embodiment.

Referring to FIG. 1, the 3D image display device in accordance with the present exemplary embodiment includes a display panel 300, a display panel driver 350, a viewpoint divider 800, and a viewpoint divider driver 850.

The display panel 300 displays an image, and may be one among display panels included in various display devices such as a plasma display panel (PDP), a liquid crystal display (LCD), and an organic light emitting diode (OLED) display.

Referring to FIG. 1 and FIG. 2, the display panel 300 includes a plurality of signal lines and a plurality of pixels PX connected to the signal lines. The pixels PX may be arranged substantially in a matrix form. In FIG. 2, a row direction is indicated by an x-axis direction, and a column direction is indicated by a y-axis direction. Each pixel PX may include a switching element (not shown) such as a thin film transistor connected to the signal lines and a pixel electrode (not shown) connected thereto. The signal lines include a plurality of gate lines transferring gate signals (referred to as "scanning signals") and a plurality of data lines transferring data voltages.

The pixel PX uniquely displays one of primary colors (spatial division) or the plurality of pixels alternately display primary colors with time (temporal division), and as a result, a desired color may be displayed by the spatial and temporal sum of the primary colors. The primary colors may be various combinations such as three primary colors or four primary colors, but the three primary colors such as red (R), green (G), and blue (B) are described as an example in the present exemplary embodiment. The pixels PX of one set displaying different primary colors may configure one dot together. One dot as a display unit of the 3D image may display a white image. The pixels PX of one pixel column may represent the same primary colors, but it is not limited thereto, and the pixels PX arranged in a direction forming a diagonal of a predetermined angle may display the same primary colors.

The display panel driver 350 transmits various driving signals such as a gate signal and a data signal to the display panel 300 to drive the display panel 300.

Referring to FIG. 1 and FIG. 2, the viewpoint divider 800 divides and transmits light of an image displayed by the pixel PX of the display panel 300 to viewpoints VP1, VP2, . . . corresponding to each pixel PX. When a distance between the 3D image display device and a point capable of viewing an optimal 3D image is called an optimal viewing distance OVD, an x-axis directional position of the point which the light of the image displayed by each pixel PX reaches at the optimal viewing distance OVD is called a viewpoint. In accordance with the exemplary embodiment, each pixel PX of the display panel 300 corresponds to one viewpoint VP1, VP2, . . . , and each pixel PX may transmit light of the image to the corresponding viewpoint VP1, VP2, . . . through the viewpoint divider 800. A viewer views different images by respective eyes at different viewpoints, and thus may perceive depth perception, that is, a 3D effect.

FIG. 2 illustrates a finite number of viewpoints VP1, VP2, . . . positioned at the optimal viewing distance OVD as an example. For example, when a viewpoint at which an image displayed by a first pixel PX1 is viewed is a first viewpoint VP1, the light of the image displayed by each first pixel PX1 may reach the first viewpoint VP through the viewpoint divider 800.

FIG. 1 and FIG. 2 show that the viewpoint divider 800 is located between the display panel 300 and the viewer, but it is not limited thereto.

The viewpoint divider driver 850 is connected to the viewpoint divider 800 to generate a driving signal for driving the viewpoint divider 800.

Figure 3:
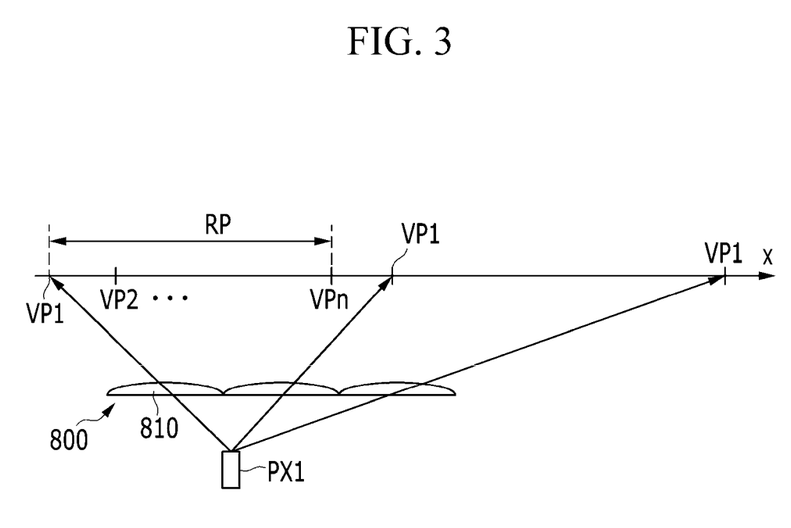
FIG. 3 shows a viewpoint divider and its viewpoints in the 3D image display device in accordance with the present exemplary embodiment.

Referring to FIG. 3, the image displayed by the display panel 300 may reach one viewpoint VP1 to VPn (n is a natural number) of a unit view area RP having a predetermined viewing angle through the viewpoint divider 800. That is, the viewpoints VP1-VPn exist in any one unit view area RP, and a corresponding viewpoint of each pixel PX may be allocated according to a position that the light reaches in one unit view area RP. Referring to FIG. 2 and FIG. 3, the viewpoint divider 800 of the present exemplary embodiment includes a plurality of viewpoint dividing unit, and the viewpoint dividing unit may include a plurality of lenticular lens 810 arranged in one direction. Each lenticular lens 810 may be extended in one direction. In the present exemplary embodiment, the extending direction of each lenticular lens 810 is parallel with the y-axis direction. In the case that the extending direction of each lenticular lens 810 is parallel with the y-axis direction, a moiré phenomenon may be generated.

Hereinafter, a method for measuring a width ratio of the pixels PX and the light blockers and designing a width of the lenticular lens 810 to prevent the moiré phenomenon while maintaining the extending direction of the lenticular lens 810 by the 3D image display device in accordance with the present exemplary embodiment will be described with reference with FIG. 4 and FIG. 5.

Figure 4:
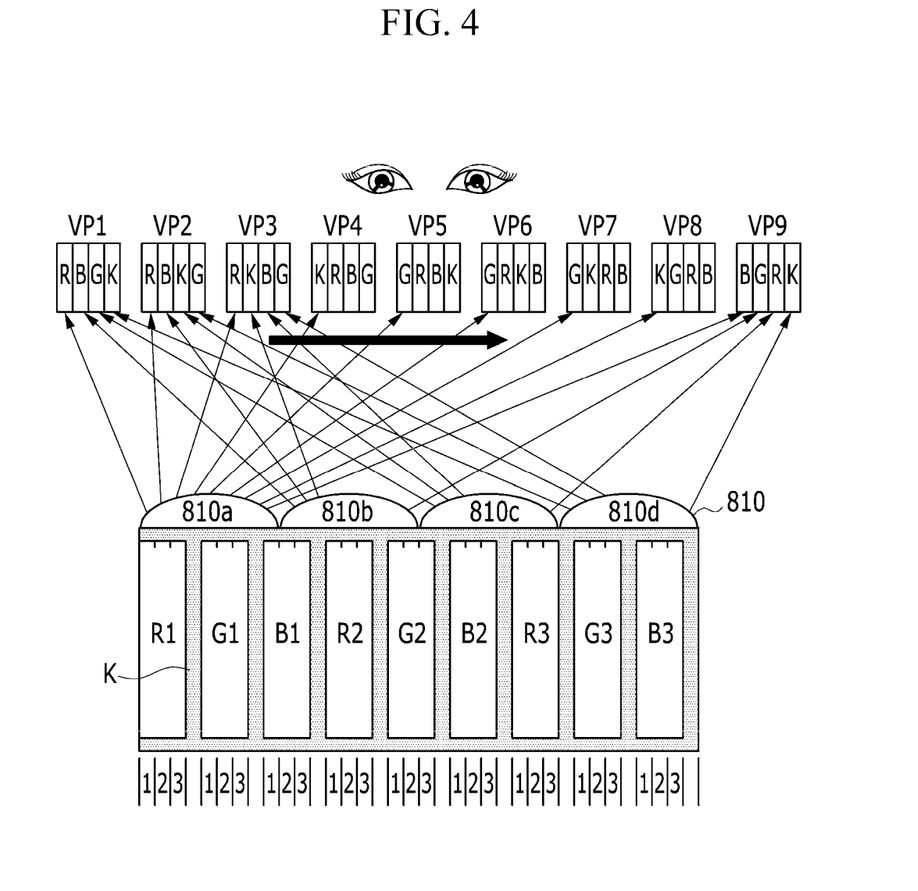
FIG. 4 shows correspondence relationships between pixels, light blockers, and lenticular lenses, and color arrangements of each view point when a width ratio of the pixels and the light blockers is 3:1 in the 3D image display device in accordance with the present exemplary embodiment.

FIG. 4 shows correspondence relationships between pixels, light blockers, and lenticular lenses, and color arrangements of each view point when the width ratio of the pixels and the light blockers is 3:1 in the 3D image display device in accordance with the present exemplary embodiment. FIG. 5 shows a color arrangement of each pixel row according to each view point in the 3D image display device described with reference to FIG. 4.

Referring to FIG. 4, in the 3D image display device of the present exemplary embodiment, the width ratio of the light blocker K located between each pixel is 3:1, and four lenticular lenses 810 may be disposed to correspond to 9 pixels. In FIG. 4, the pixels may include red pixels R1, R2, and R3, green pixels G1, G2, and G3, and blue pixels B1, B2, and B3. A total of 9 viewpoints VP1, VP2, . . . , and VP9 may be formed at a unit view region RP by using design of such pixels and lenticular lenses 810. As such, an image formation condition may be set such that each pixel is divided into 3 regions 1, 2, and 3, and images of each region are assigned to separate viewpoints VP in order to form 9 viewpoints VP1, VP2, . . . , and VP9.

For example, the description will be made based on the lenticular lens 810. A first lens 810a serves to refract light that passes through a first red pixel R1, a first green pixel G1, and a first region 1 of a first blue pixel B1. A second lens 810b serves to refract light that passes through a second region 2 and a third region 3 of the first blue pixel B1, a second red pixel R2, and a first region 1 and a second region 2 of the second green pixel G2. A third lens 810c serves to refract light that passes through a third region 3 of the second green pixel G2, a second blue pixel B2, and a third red pixel R3. A fourth lens 810d serves to refract light that passes through a third green pixel G3 and a third blue pixel B3.

In this case, as shown in FIG. 4, the light of the first region 1 of the first red pixel R1 is refracted in the first lens 810a, which is assigned to the first viewpoint VP1, the light of the second region 2 of the first red pixel R1 is refracted in the first lens 810a, which is assigned to the second viewpoint VP2, and the light of the third region 3 of the first red pixel R1 is refracted in the first lens 810a, which is assigned to the third viewpoint VP3. A light blocker K is provided between the first red pixel R1 and the first green pixel G1 to block light, and such light blocking effect is assigned to the fourth viewpoint VP4. Consequentially, the light of the first region 1 of the first green pixel G1 is refracted in the first lens 810a, which is assigned to the fifth viewpoint VP5, the light of the second region 2 of the first green pixel G1 is refracted in the first lens 810a, which is assigned to the sixth viewpoint VP6, and the light of the third region 3 of the first green pixel G1 is refracted in the first lens 810a, which is assigned to the seventh viewpoint VP3. A light blocker K is provided between the first green pixel G1 and the first blue pixel B1 to block light, and such light blocking effect is assigned to the eighth viewpoint VP8. Consequently, the light of the first region 1 of the first blue pixel B1 is refracted in the first lens 810a, which is assigned to the ninth viewpoint VP9. In this way, the lights can be refracted in the second lens 810b, the third lens 810c, and the fourth lens 810d, which are assigned to the respective viewpoints VP.

Figure 5:
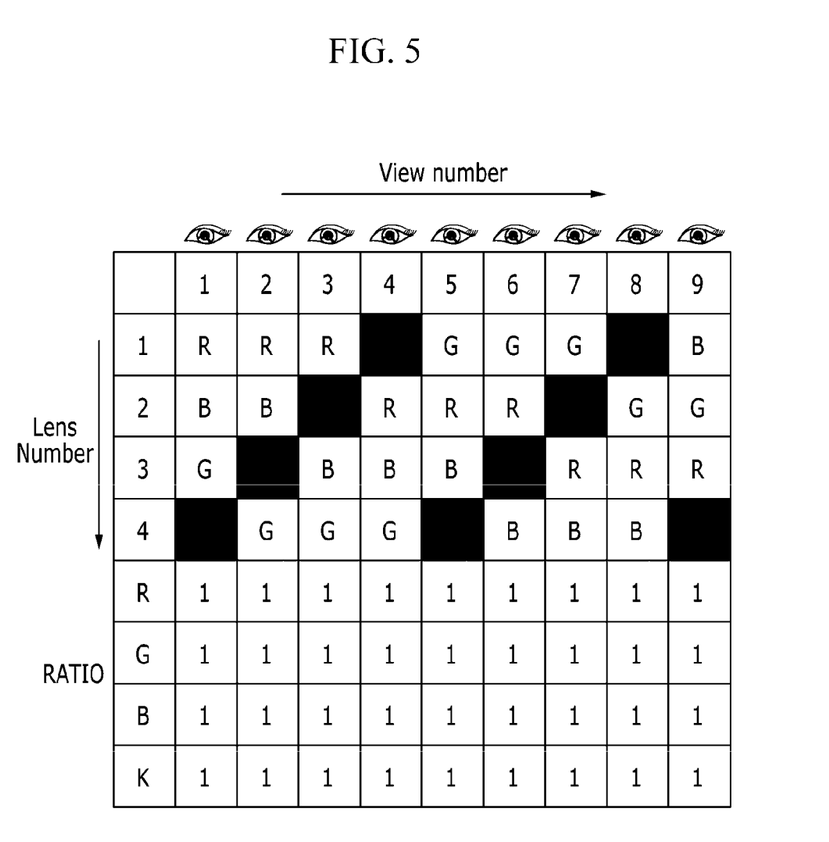
FIG. 5 shows a color arrangement of each pixel row according to each view point in the 3D image display device described with reference to FIG. 4.

FIG. 5 is a table showing an arrangement of pixels which are assigned to the respective viewpoints VP as the lights are refracted in the first lens 810a, the second lens 810b, the third lens 810c, and the fourth lens 810d. Referring to FIG. 5, the first viewpoint VP1 corresponds to one red pixel R, one green pixel G, and one blue pixel B, and one light blocker K. The mixing ratio is the same in other viewpoints VP2, VP3, . . . , and VP9 as well as the first viewpoint VP1 with only difference in arrangement sequence of R, G, B, and K.

In the present exemplary embodiment, black images formed by the light blockers K are uniformly mixed with images formed by the pixels R, G, and B, and thus the luminance at each viewpoint VP becomes uniform. Accordingly, it is possible to prevent the moiré phenomenon.

Figure 6:
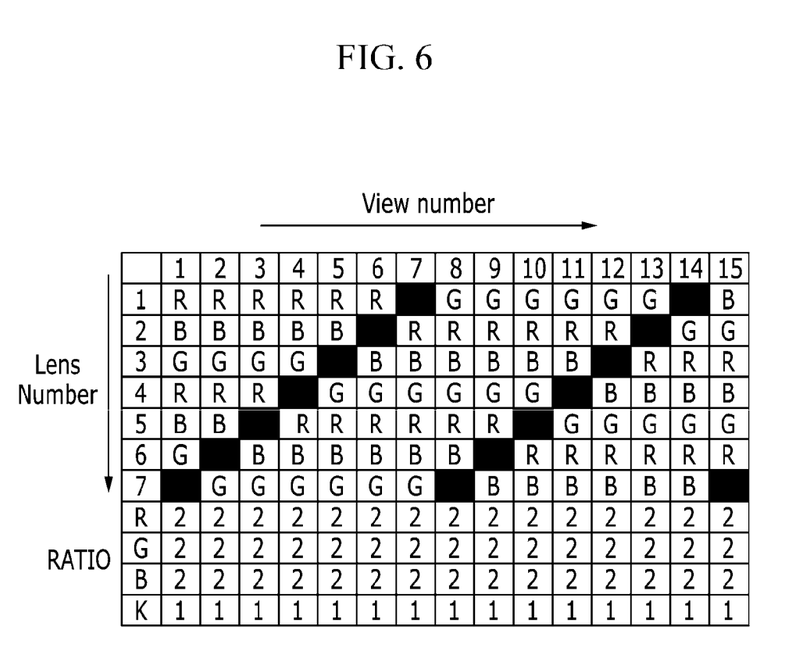
FIG. 6 shows a color arrangement of each pixel row according to each view point when the width ratio of the pixels and the light blockers is 6:1 in the 3D image display device in accordance with a modification of the present exemplary embodiment.

FIG. 6 shows a color arrangement of each pixel row according to each view point when the width ratio of the pixels and the light blockers is 6:1 in the 3D image display device in accordance with a modification of the present exemplary embodiment. Referring to FIG. 5, the first viewpoint VP1 corresponds to two red pixel R, two green pixel G, and two blue pixel B, and one light blocker K. The mixing ratio is the same in other viewpoints VP2, VP3, . . . , and VP9 as well as the first viewpoint VP1 with only difference in arrangement sequence of R, G, B, and K.

The modification to be described with reference to FIG. 6 is substantially the same as the exemplary embodiment described with reference to FIG. 4 and FIG. 5, except that the width ratio of the pixels and the light blockers is 6:1 and 7 lenticular lenses may be disposed to correspond to 15 pixels in the 3D image display device. By using such design of pixels and lenticular lenses, a total of 15 viewpoints VP1, VP2, . . . , and VP15 can be formed at the unit view region RP. As such, an image formation condition may be set such that each pixel is divided into 6 regions, and images of each region are assigned to separate viewpoints VP in order to form 15 viewpoints VP1, VP2, . . . , and VP15.

The description made with reference to FIG. 4 and FIG. 5 other than the aforementioned difference is applicable to the modification of FIG. 6.

Figure 7:
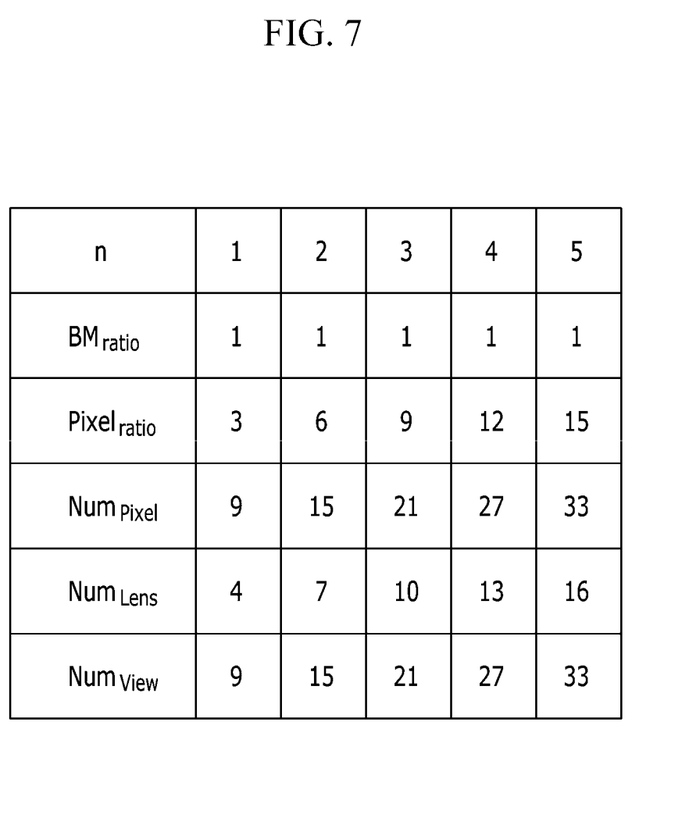
FIG. 7 is a table showing values that satisfy a structure design equation for preventing a moiré phenomenon in the 3D image display device in accordance with the present exemplary embodiment.

FIG. 7 is a table showing values that satisfy a structure design equation for preventing a moiré phenomenon in the 3D image display device in accordance with the present exemplary embodiment.

In the 3D image display device in accordance with the present exemplary embodiment, the number $N_P$ ($Num_{Pixel}$) of pixels at the unit view region satisfies $N_P=2(3n+1)+1$, the number $N_L$ ($Num_{Lens}$) of viewpoint dividing units satisfies $N_L=3n+1$, and the number $N_V$ ($Num_{View}$) of viewpoints satisfies $N_V=2(3n+1)+1$ when the width ratio of the pixels in the row direction and the light blockers in the row direction is $3n:1$, n being a natural number. $N_P$ pixels are provided to correspond to $N_L$ viewpoint dividing units. One pixel may be divided into 3n regions of the pixel, and the 3n regions may be assigned to the respective different viewpoints by using the viewpoint dividing units. In the present exemplary embodiment, each of the 3n regions of the pixel may be assigned to different viewpoints by using the same viewpoint dividing unit or two different viewpoint dividing units.

In the present exemplary embodiment, the viewpoint dividing unit may be a lenticular lens, but is not limited thereto. Alternatively, the viewpoint dividing unit may be a liquid crystal lens or the like.

FIG. 7 is a table showing the ratio of light blockers and pixels, the number of pixels corresponding to the unit view regions, the number of lenses, and the number of viewpoints in the 3D image display device of the present exemplary embodiment for preventing the moiré phenomenon when n is 1, 2, 3, 4, and 5. Black images formed by the light blockers K can be uniformly mixed with images formed by the pixels R, G, and B to make the luminance at each viewpoint VP uniform by using a structural design satisfying such conditions.

The exemplary embodiment descried with reference to FIG. 4 and FIG. 5 corresponds to the case that n is 1, while the modification described with reference to FIG. 6 corresponds to the case that n is 2. In addition, n may be a natural number that is equal to or greater than 6 without being limited thereto.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of Symbols>

| | |
|---|---|
| 300: display panel | 350: display panel driver |
| 800: viewpoint divider | 810: lenticular lens |
| 850: viewpoint divider driver | |

What is claimed is:

1. A 3D image display device comprising:
   a display panel configured to include a plurality of pixels arranged in a matrix shape and respectively representing one color among a plurality of primary colors, and light blockers provided between the pixels; and
   a viewpoint divider configured to divide an image which is displayed by the display panel into at least two viewpoints, the viewpoint divider including a plurality of viewpoint dividing units,
   wherein the viewpoint dividing units are located in parallel with respect to a column direction of the display panel,
   a number $N_P$ of R, G, B pixels at a unit view region satisfies $N_P=2(3n+1)+1$, a number $N_L$ of viewpoint dividing units satisfies $N_L=3n+1$, and a number $N_V$ of viewpoints satisfies $N_V=2(3n+1)+1$ when a width ratio of the pixels in a row direction and the light blockers forming a black image in the row direction is $3n:1$, n being a natural number, to uniformly mix black images formed the light blockers with images formed by the pixels to make a luminance of each viewpoint uniform, and
   the $N_P$ pixels are located to correspond to the $N_L$ viewpoint dividing units.

2. The 3D image display device of claim 1, wherein the viewpoint divider includes a plurality of lenticular lenses, and the viewpoint dividing units include the lenticular lenses.

3. The 3D image display device of claim 2, wherein the $N_V$ viewpoints have the same luminance.

4. The 3D image display device of claim 3, wherein one of the pixels is divided into 3n regions, and the 3n regions of the pixel are respectively assigned to different viewpoints by using the viewpoint dividing units.

5. The 3D image display device of claim 4, wherein the 3n regions of the pixel are respectively assigned to different viewpoints by using the same viewpoint dividing unit.

6. The 3D image display device of claim 4, wherein the 3n regions of the pixel are respectively assigned to different viewpoints by using two different viewpoint dividing units.

7. The 3D image display device of claim 4, wherein the pixels include red pixels, green pixels, and blue pixels that are sequentially repeated in the row direction.

8. The 3D image display device of claim 4, wherein the pixels include red pixels, blue pixels, and green pixels that are sequentially repeated in the row direction.

9. The 3D image display device of claim 3, wherein the viewpoint divider divides an image displayed by the display panel into 9 viewpoints.

10. The 3D image display device of claim 3, wherein the viewpoint divider divides an image displayed by the display panel into 15 viewpoints.

11. The 3D image display device of claim 1, wherein each of the $N_V$ viewpoints includes one light blocker.

* * * * *